United States Patent
Harris et al.

(10) Patent No.: US 10,126,078 B1
(45) Date of Patent: Nov. 13, 2018

(54) RETRACTABLE TAKEDOWN PIN FOR FIREARM

(71) Applicant: Adaptive Technical Solutions, Inc., San Diego, CA (US)

(72) Inventors: Courtney Harris, San Diego, CA (US); Glenn Banaag, Los Angeles, CA (US); Kevin Mar, Sunnyvale, CA (US)

(73) Assignee: Adaptive Technical Solutions, Inc., San Diego, CA (US)

( * ) Notice: Subject to any disclaimer, the term of this patent is extended or adjusted under 35 U.S.C. 154(b) by 0 days.

(21) Appl. No.: 15/924,135

(22) Filed: Mar. 16, 2018

(51) Int. Cl.
| | | |
|---|---|---|
| *F41A 11/00* | (2006.01) | |
| *F41A 3/66* | (2006.01) | |
| *F16B 21/12* | (2006.01) | |
| *F16B 19/02* | (2006.01) | |

(52) U.S. Cl.
CPC .............. *F41A 11/00* (2013.01); *F16B 19/02* (2013.01); *F16B 21/125* (2013.01)

(58) Field of Classification Search
CPC .................................. F41A 3/66; F41A 11/00
USPC ............................................. 42/75.03, 75.01
See application file for complete search history.

(56) References Cited

U.S. PATENT DOCUMENTS

| | | | | |
|---|---|---|---|---|
| 9,243,857 | B2* | 1/2016 | Mills ...................... | F41A 11/04 |
| 9,400,006 | B1 | 7/2016 | Huang et al. | |
| 9,791,229 | B1* | 10/2017 | Cross ...................... | F41A 11/00 |
| 9,909,828 | B1* | 3/2018 | Klein ...................... | F41A 11/00 |
| 2015/0308768 | A1* | 10/2015 | Mills ...................... | F41A 11/04 |
| | | | | 42/75.03 |
| 2016/0069628 | A1* | 3/2016 | Fluhr ...................... | F41A 17/38 |
| | | | | 42/6 |
| 2016/0109198 | A1* | 4/2016 | Gardner ................... | F41A 3/66 |
| | | | | 411/500 |
| 2018/0156554 | A1* | 6/2018 | Klein ...................... | F41A 11/00 |

* cited by examiner

*Primary Examiner* — Reginald S Tillman, Jr.
(74) *Attorney, Agent, or Firm* — Kevin Keener; Keener and Associates P.C.

(57) ABSTRACT

A takedown pin assembly for a firearm is disclosed. The takedown pin assembly comprises an elongate pin, a spring, and a head disposed on one end of the pin. The pin further comprises a channel extending along at least a portion of the elongate pin in the direction of the pin's longitudinal axis. The channel has a width sufficient to receive a detent pin from a firearm. The elongate pin is configured to fit within a hole in an upper receiver or lower receiver of a firearm. The head has a lever handle extending laterally from a center portion of the head. A user engages the lever on the head to rotate the pin and allowing the detent pin to travel in the channel. The spring pushes the pin out from the firearm receivers to allow the user to open the action.

20 Claims, 10 Drawing Sheets

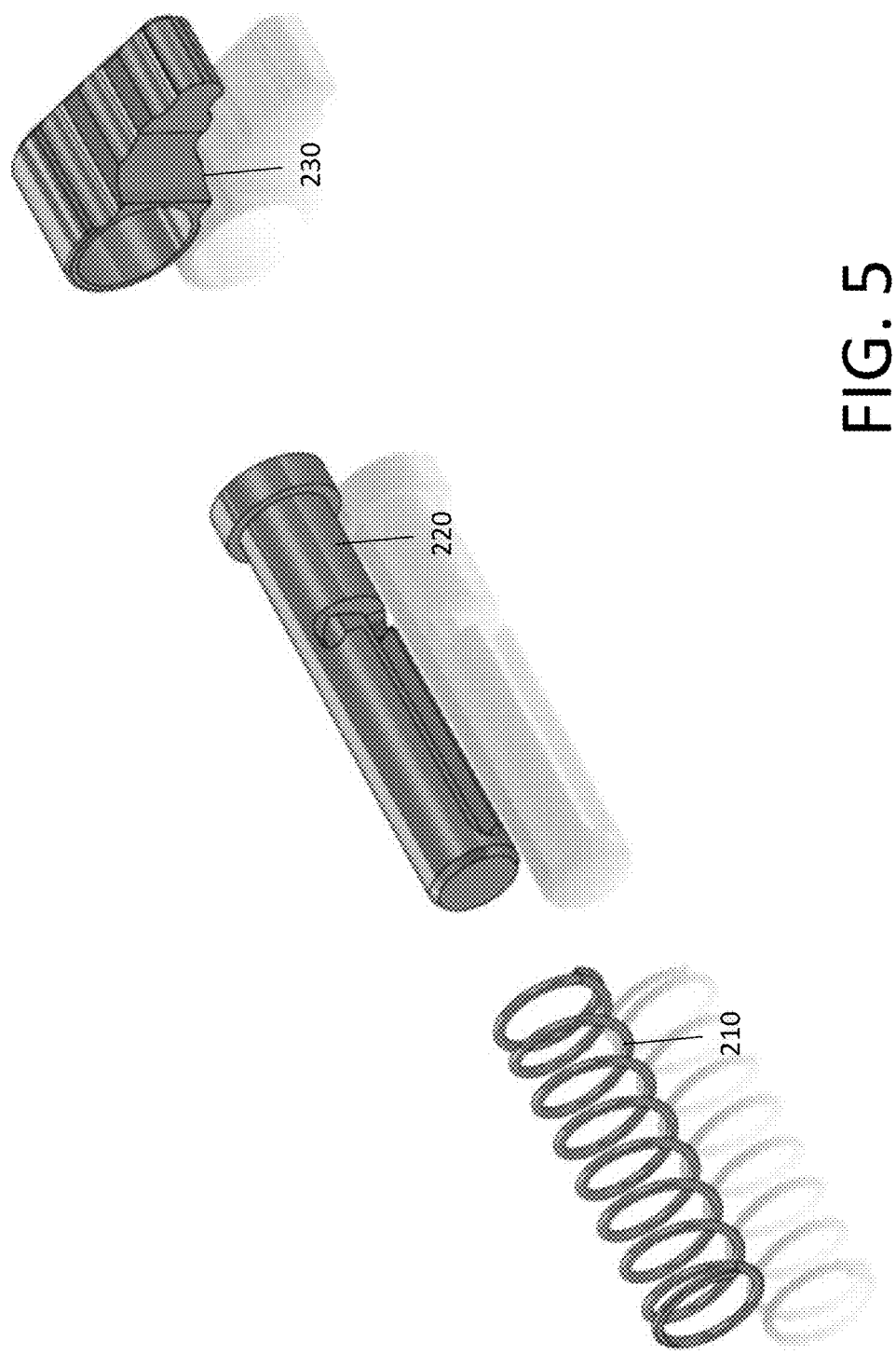

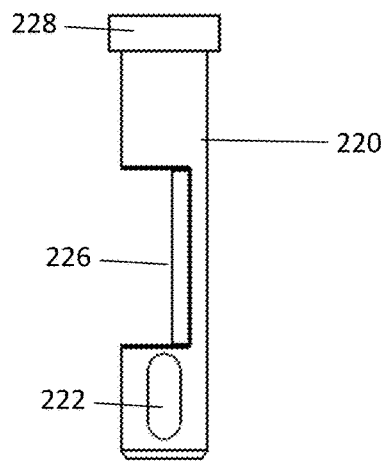
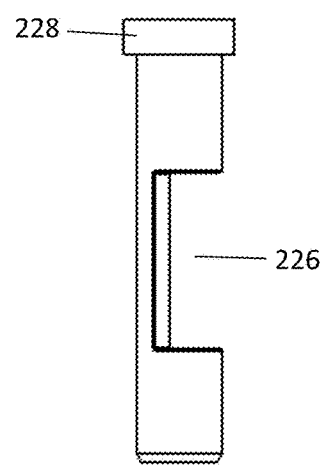
FIG. 9A    FIG. 9B
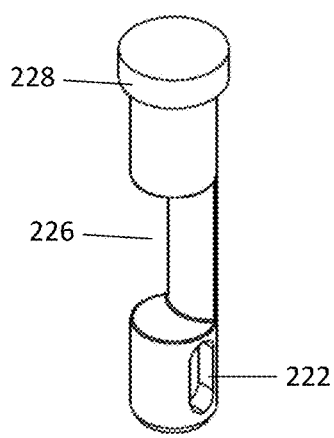
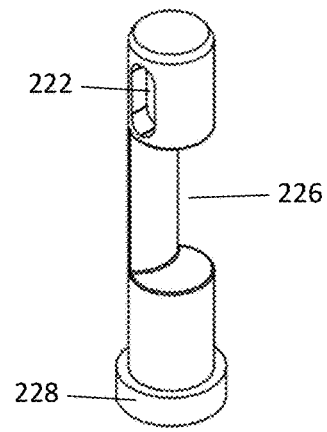
FIG. 9C    FIG. 9D

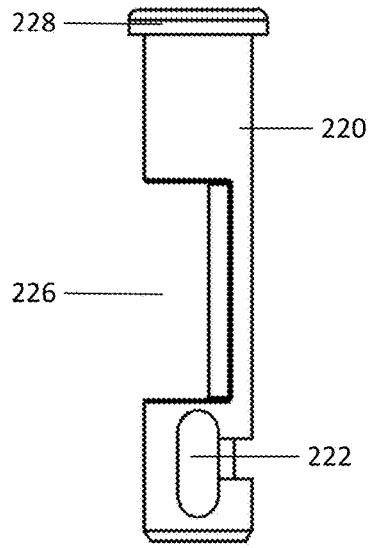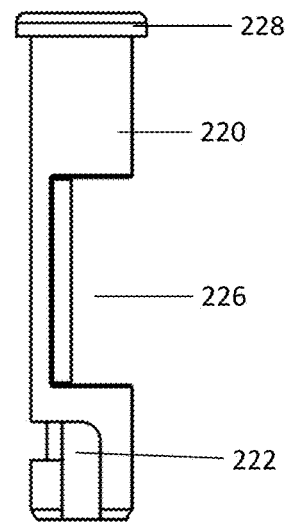
FIG. 10A  FIG. 10B
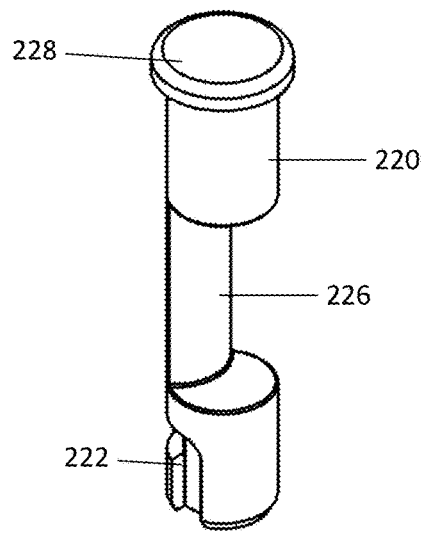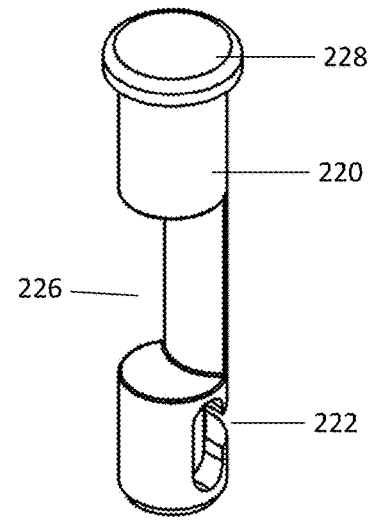
FIG. 10C  FIG. 10D

RETRACTABLE TAKEDOWN PIN FOR FIREARM

FIELD OF THE INVENTION

The invention pertains generally to firearm components and more specifically to a retractable takedown pin for fast disassembly and reassembly of a firearm.

BACKGROUND OF INVENTION

Semi-automatic firearms have been known for a long time. The first semi-automatic rifle was introduced in 1885. The M-16 automatic rifle has been used by the military for years. A civilian version of the M-16 is known as the AR-15 and is a semi-automatic rifle. The AR-15 has been manufactured and sold to civilians for many years. Standard AR-15 semi-automatic rifles are manufactured and distributed with takedown pins. Takedown pins are utilized to secure the upper receiver to the lower receiver. To access the action, a user needs to remove the takedown pin. The user may then separate the lower receiver from the upper receiver. The user can clean the firearm or otherwise access the action. When done the user can then reattach the upper receiver to the lower receiver. The user inserts the takedown pin into the channel to secure the upper receiver to the lower receiver.

Standard takedown pins may be deficient. A detent pin within the body of the receiver may hold a takedown pin in place. However the takedown pin may still be fully removed. This presents an issue if the user misplaces or loses the takedown pin. What is needed is a takedown pin which is specially designed such that it is easy to remove and reinsert and which is not easily fully removed from the firearm.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention is directed toward a takedown pin assembly. The takedown pin assembly comprises an elongate pin having a first end, a second end, and a longitudinal axis extending between the first end and the second end; the elongate pin further comprising a channel within a body of the pin and wherein the channel extends along at least a portion of the elongate pin in the direction of the longitudinal axis; wherein the channel has a width sufficient to receive a detent pin from a firearm; wherein the elongate pin is configured to fit within a hole in an upper receiver or lower receiver of a firearm; a spring having a first end and a second end; a head disposed on the first end of the elongate pin, wherein the head has a lever handle extending laterally from a center portion of the head; and wherein the elongate pin is disposed within a space within the spring.

In another embodiment of the invention, the takedown pin assembly the elongate pin may further comprise a flange disposed at the first end of the elongate pin. The elongate pin may further comprise a protrusion extending from the first end of the elongate pin. The protrusion may extend in the same direction as the longitudinal axis or may extend perpendicular to the longitudinal axis.

The head may further comprise a central recess in the center portion; and one or more cavities disposed in the central recess. The channel of the elongate pin may further comprise a lateral extension disposed at an angle to the longitudinal axis. The channel of the elongate pin may also further comprise a plurality of lateral extensions where each of the plurality of lateral extensions is disposed at an angle to the longitudinal axis. The head may further comprise a central recess having a plurality of cavities disposed radially around a center point in the central recess. In another embodiment, the channel has a first depth at a first point and a second depth at a second point and the first depth and the second depth are not equal.

In another embodiment the invention is directed toward a takedown pin assembly comprising an elongate pin having a first end, a second end, and a longitudinal axis extending between the first end and the second end; wherein the elongate pin further comprises a lever extending laterally from the first end of the elongate pin; a channel within a body of the pin, wherein the channel extends along at least a portion of the elongate pin in the direction of the longitudinal axis; wherein the channel has a width sufficient to receive a detent pin from a firearm; wherein the elongate pin is configured to fit within a hole in an upper receiver or lower receiver of a firearm; and a spring having a first end and a second end.

In another embodiment, the takedown pin assembly comprising an elongate pin having a first end, a second end, and a longitudinal axis extending between the first end and the second end; the elongate pin further comprising a channel within the body of the elongate pin, wherein the channel extends along at least a portion of the elongate pin in the direction of the longitudinal axis and wherein the channel has a width sufficient to receive a detent pin from a firearm; an indentation extending into the elongate pin; wherein the indentation is disposed between the channel and the first end; wherein the indentation extends along at least a second portion of the elongate pin in the same direction as the longitudinal axis; a spring having a first end and a second end; wherein the elongate pin is disposed within a space in the spring; and wherein the elongate pin is configured to fit within a hole in an upper receiver or lower receiver of a firearm. The indentation may have a depth less than a radius of the elongate pin or a depth greater than a radius of the elongate pin.

Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein:

FIG. 5 is a perspective exploded view of the takedown pin assembly;

FIG. 9A is a side view of an alternative embodiment of the pin;

FIG. 9B is a side view of an alternative embodiment of the pin;

FIG. 9C is a top perspective view of an alternative embodiment of the pin;

FIG. 9D is a bottom perspective view of an alternative embodiment of the pin;

FIG. 10A is a side view of an alternative embodiment of the pin;

FIG. 10B is a side view of an alternative embodiment of the pin;

FIG. 10C is a top perspective view of an alternative embodiment of the pin; and

FIG. 10D is a top perspective view of an alternative embodiment of the pin.

DETAILED DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

Figure 1:
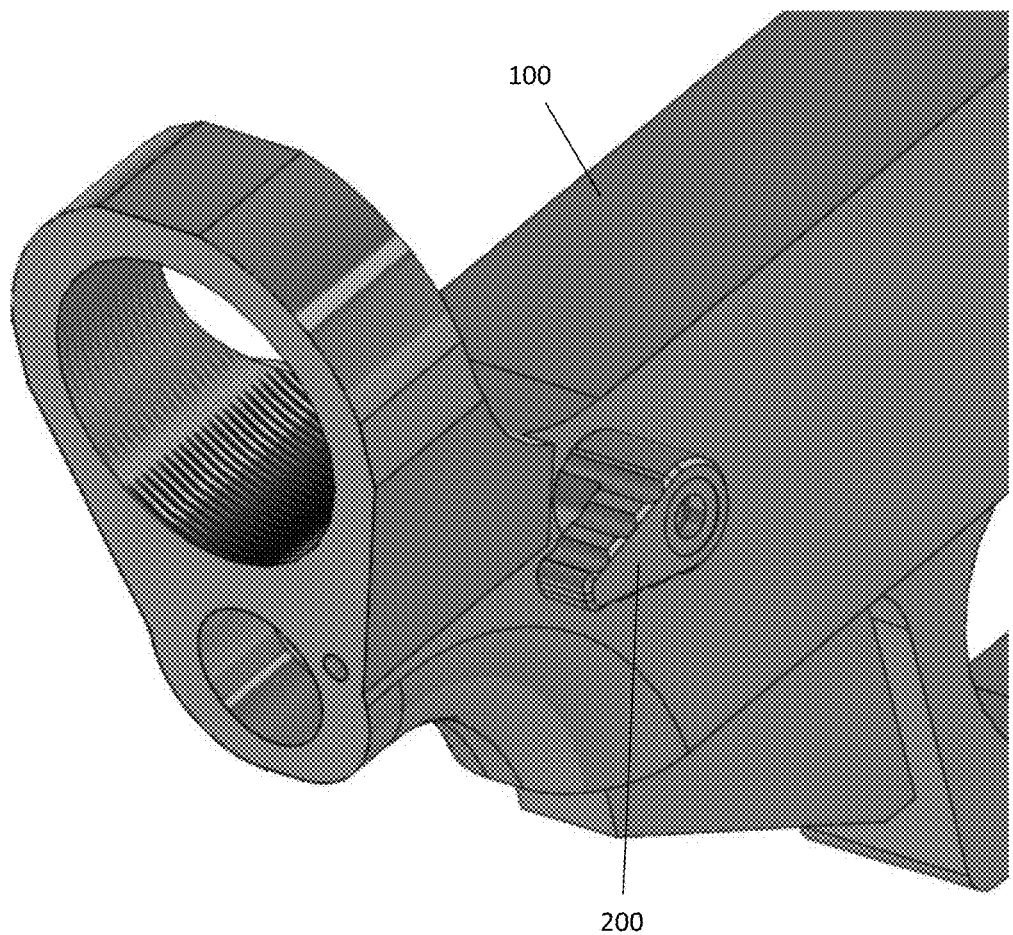
FIG. 1 is a perspective view of the takedown pin assembly attached to a lower receiver.
Figure 2:
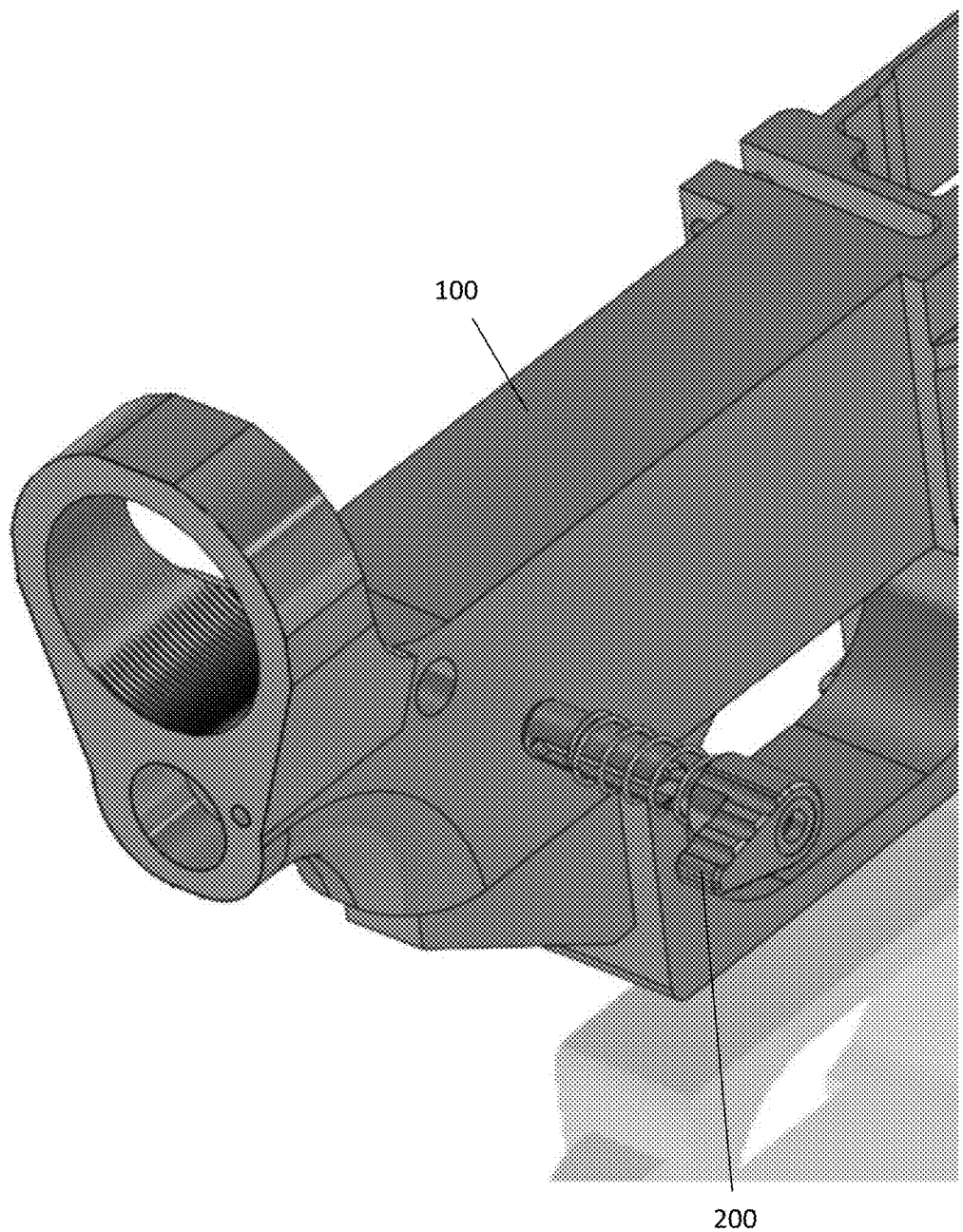
FIG. 2 is a perspective view of the takedown pin assembly removed from a lower receiver.

The invention is directed toward a takedown pin assembly 200. As shown in FIG. 1, the takedown pin assembly 200 is installed onto a firearm 100. The takedown pin assembly 200 slides into a channel in a firearm 100 to secure the lower receiver to the upper receiver, as shown in FIG. 1. To remove the upper receiver from the lower receiver the user engages the takedown pin assembly 200. The takedown pin assembly 200 then moves laterally to permit the upper receiver to pivot away from the lower receiver, as illustrated in FIG. 2.

Figure 3:
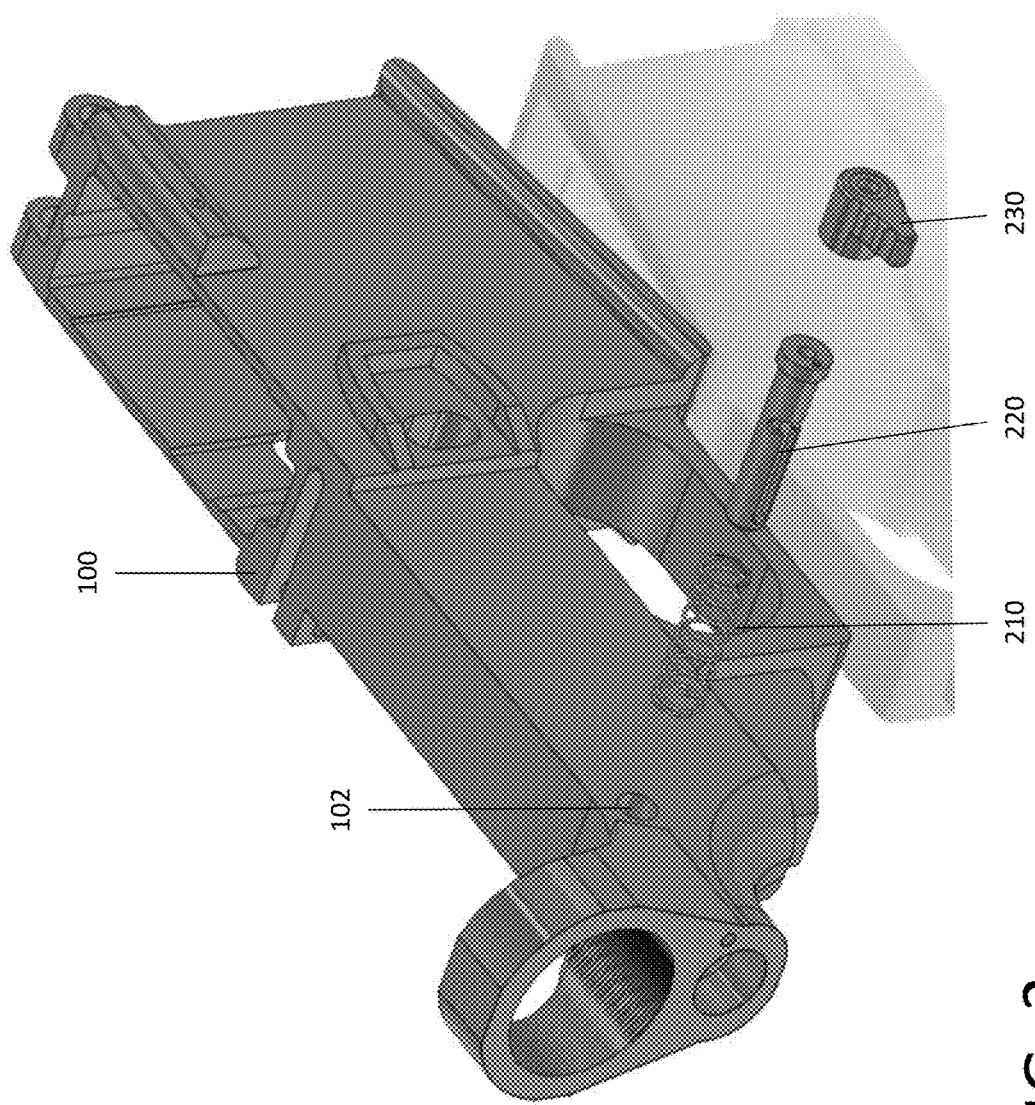
FIG. 3 is a perspective exploded view of the takedown pin assembly and lower receiver.
Figure 4:
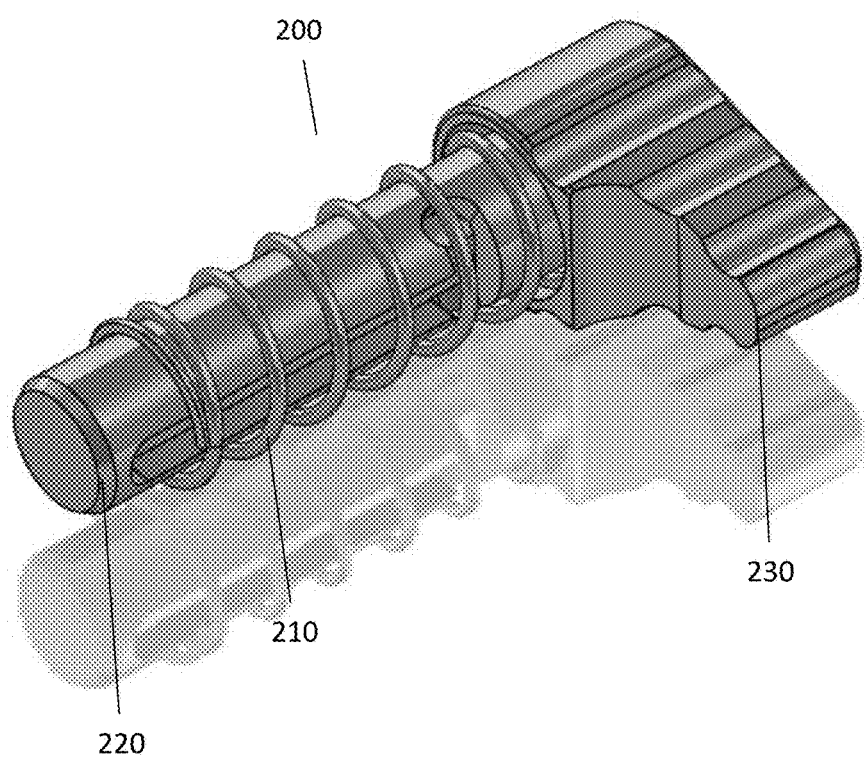
FIG. 4 is a perspective view of the takedown pin assembly.
Figure 6A:
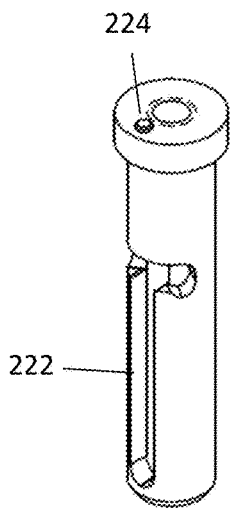
FIG. 6A is a top perspective view of the pin.
Figure 6B:
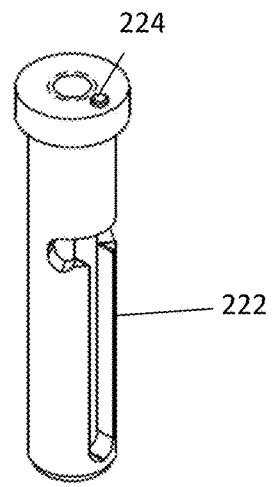
FIG. 6B is a top perspective view of the pin.
Figure 6C:
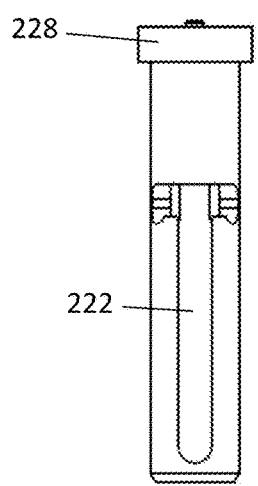
FIG. 6C is a side view of the pin.
Figure 6D:
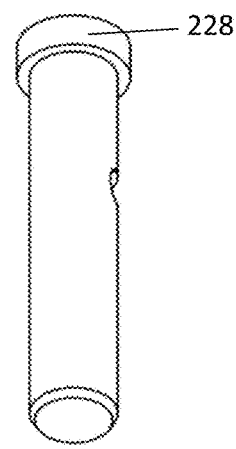
FIG. 6D is a bottom perspective view of the pin.

As illustrated in FIG. 3 the takedown pin assembly 200 is configured to fit within the channel 102 of the firearm 100. In the preferred embodiment, the takedown pin assembly 200 comprises a spring 210, a pin 220, and a pin head 230. As seen in FIG. 4 and FIG. 5 the preferred structure of the preferred embodiment of the takedown pin assembly 200 is illustrated. The main component of the pin takedown assembly 200 is the pin 220. The pin 220 may be any size and shape. In the preferred embodiment the pin 220 is cylindrical. One end of the pin 220 is disposed within the head 230. The pin 220 extends from the head 230. Disposed on the pin 220 is a spring 210. One end of the spring 210 engages the head 230. The head 230 may be any size and shape. The spring 210 may also be any size and shape.

Referring to FIGS. 6A-6D, the preferred embodiment of the pin 220 is illustrated. The pin 220 has a shaped groove 222. The shaped groove 222 extends along a portion of the length of the pin 220. The shaped groove 222 may be any size and shape. The shaped groove 222 is an indentation in the body of the pin 220. In another embodiment the pin 220 may be hollow and the shaped groove 222 is a shaped aperture in the body of the pin 220. In the preferred embodiment the shaped groove 222 is shaped as a capital letter "T". The top of the letter "T" is disposed toward the head 230. The lower part of the "T" is disposed at the end opposite of the head 230. Other shapes may be known for the shaped groove 222, such as a straight line, an angled line, an "S" shape, an "L" shape, or any other shape. In some embodiments the pin 220 may have two or more shaped grooves 222. The shaped groove 222 may have one or more lateral extensions. The main section of the shaped groove 222 is parallel to the longitudinal axis of the pin 220. The lateral extensions may be at any angle to the longitudinal axis. In the preferred embodiment the lateral extension is at a ninety degree angle to the longitudinal axis. In other embodiments the lateral extension of may be at any angle between 1 degree and 179 degrees from the longitudinal axis.

At one end of the pin 220 is a flange 228. The flange 228 may be any size and shape. The flange 228 extends radially outward from the pin 220. In the preferred embodiment the flange 228 is a circular extension of the pin 220 which has a greater diameter than the remainder of the pin 220. In other embodiments the flange 228 may be one or more tabs protruding laterally from the pin 220. The flange 228 is any member or component of the pin 220 which presents a surface to engage the spring 210. In other embodiments there may be an indentation in the pin 220 to receive the end of the spring 210. In other embodiments the spring 210 may be attached to the pin 220 by any known means, such as by adhesive or welding.

At the end of the pin 220 is a protrusion 224. The protrusion 224 may be any size and shape. In the preferred embodiment the protrusion 224 extends longitudinally from the end of the pin 220. The protrusion 224 is circular but may be other shapes as well. In other embodiments there may be two or more protrusions 224. In other embodiments the protrusion 224 extends radially from the pin 220.

Figure 7A:
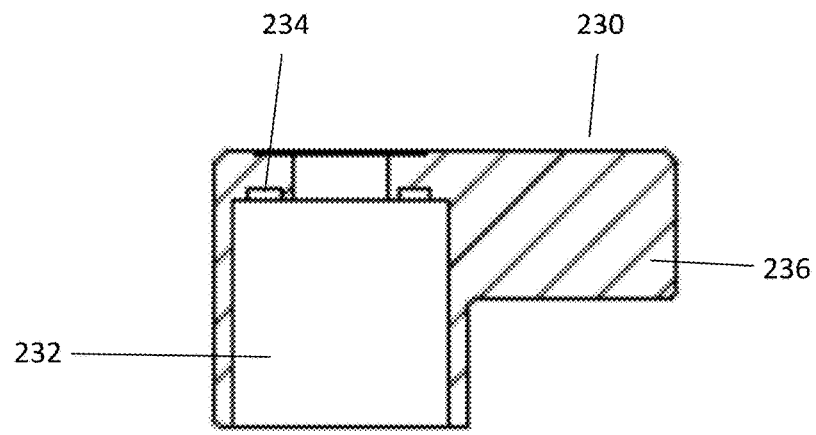
FIG. 7A is a cut away view of the head.
Figure 7B:
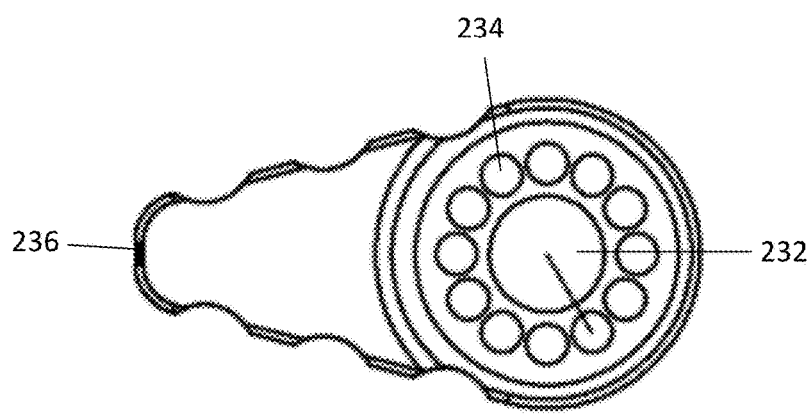
FIG. 7B is a bottom view of the head.

Referring to FIGS. 7A and 7B, the preferred embodiment of the head 230 is illustrated. The head 230 has a lever 236. The lever 236 permits a user to rotate the pin 220 along its longitudinal axis. The head 230 has a central recess 232. The central recess 232 may be any size and shape. The central recess 232 extends into the body of the head 230. At the end of the central recess are a plurality of cavities 234. Each cavity 234 extends into the body of the head 230. In the preferred embodiment the cavities 234 are arranged as a circle. In this embodiment the plurality of cavities 234 are disposed around a center point in the central recess 232. The center point is the center point in the diameter of the circle formed by the plurality of cavities 234. In other embodiments there may be only one cavity 234. In other embodiments the cavities may be arranged in other shapes. There may be any number of cavities 234.

The takedown pin assembly 200 is configured so that one end of the pin 220 is disposed within the central recess 232 of the head. In addition, one end of the spring 210 is disposed within the central recess 232 of the head 230. In the preferred embodiment the head 230 rotates freely about the spring 210 and pin 220. The pin 220 and spring 210 may press against the internal surface of the central recess 232 with sufficient friction to prevent the head 230 from falling off of the pin 220. The protrusion 224 of the pin 220 is configured to fit within any one cavity 234 of the head 230. The head 230 may rotate freely about the pin 220 and the user may press the head 230 laterally against the pin 220 so that the protrusion 224 extends within the first cavity 234 encountered.

When the takedown pin assembly 200 is pushed into the firearm 100, the free end of the spring 210 presses against the external surface of the firearm 100. The spring 210 is compressed within the central recess 232 of the head 230. The spring 210 presses against the flange 228 of the pin 220, pushing the pin 220 laterally outward from the channel 102 of the firearm 100. The pin 220 is configured within the firearm such that the detent pin (not shown) within the body of the firearm 100 extends into the shaped groove 222 of the pin 220. To stay in the locked position the user rotates the head 230 about its central axis. When this is done the protrusion 224 is disposed within a cavity 234. This causes the pin 220 to rotate about its central axis. The detent pin then resides within one of the lateral ends of the "T" of the shaped groove 222. The spring 210 presses the pin 220 laterally outward but the detent pin prevents the lateral movement of the pin 220. When the user desires to remove the pin 200 the user turns the head 230 by pressing on the lever 236. The cavity 234 of the head 230 presses against the protrusion 224 of the pin 200, causing the pin 220 to turn about its axis. When the pin 220 turns the detent pin is moved out of one of the lateral ends of the "T" into the central axis. When in this position the detent pin no longer prevents the outward movement of the pin 220. The spring 210 pushes against the flange 228 of the pin to move the pin 220 out of the channel 102 of the firearm 100. The pin 220 moves laterally until the detent pin reaches the bottom end of the "T". The detent pin prevents the pin 220 from being fully removed from the channel 102 of the firearm 100. The user then may open the action of the firearm. When the user wants to reassemble the firearm 100 the user reattaches the upper receiver to the lower receiver. The user presses the pin 220 inward through the channel 102. When the pin 220 is full within the channel 102, the user rotates the lever 236 of the head 230. The detent pin is then fully resting within a lateral side of the "T" and the pin 220 is again locked into place.

The takedown pin assembly 200 may be made in many configurations. In one embodiment the pin 220 is utilized only with a spring 210 without a head 230. In another embodiment the pin 220 and head 230 are one fused component. In another embodiment the pin 220 may pass through an aperture in the head 230 with the flange 228 extending around the body of the head 230. In another embodiment there may be two takedown pin assemblies 200 used on a single firearm 100, with each takedown pin assembly 200 mounted on opposite sides of the firearm 100.

Figure 8:
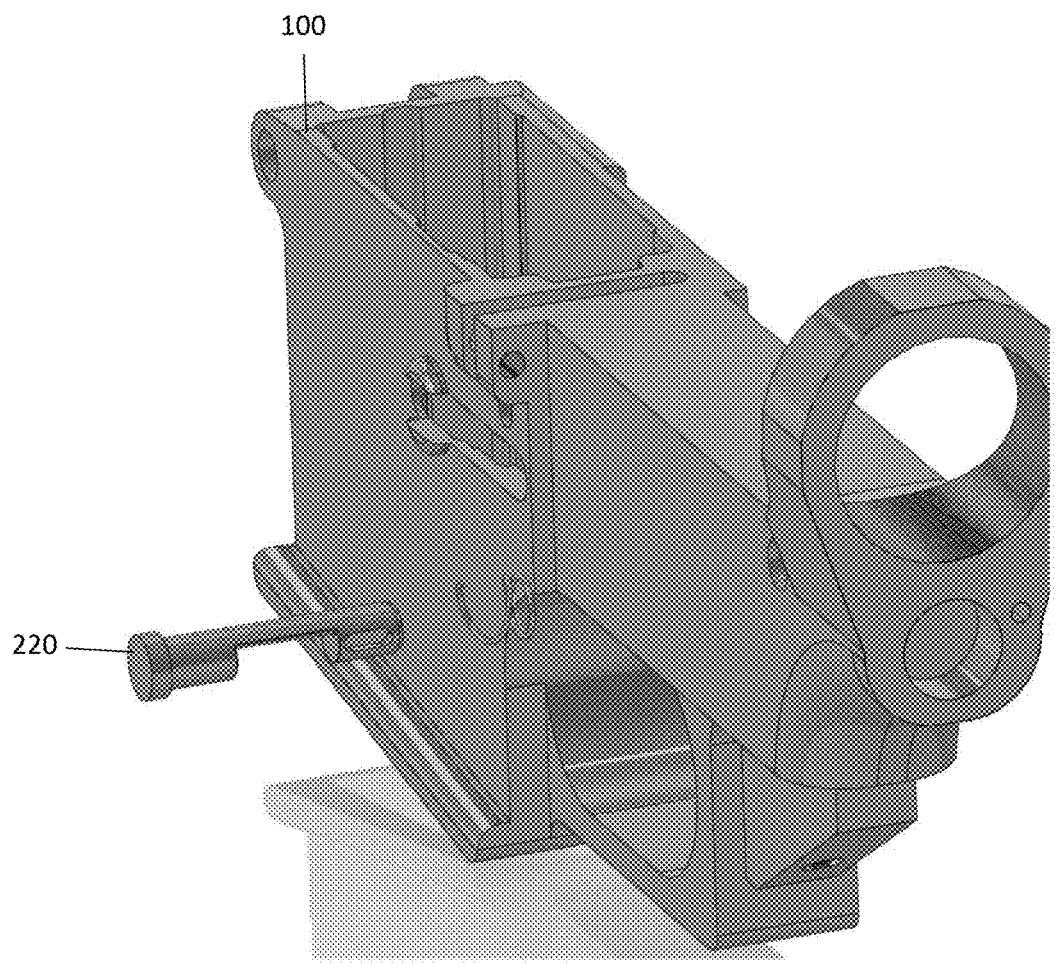
FIG. 8 is an exploded view of an alternative embodiment of the takedown pin assembly and lower receiver.

Referring to FIG. 8 an alternative embodiment of the takedown pin 200 is illustrated. In the preferred version of this embodiment the pin 220 and spring 210 are utilized without a head 230. This embodiment of the pin 220 is shaped in a different configuration.

Referring to FIGS. 9A-D, the alternative embodiment of the pin 220 is illustrated. In this embodiment the pin 220 comprises a shorter shaped groove 222. The shaped groove 222 is disposed on the opposite end from the flange 228. In the middle of the length of the pin 220 is an indentation 226. The indentation 226 may be any size and shape. In the preferred embodiment the indentation 226 extends over half of the diameter of the pin 220. In the preferred embodiment the indentation 226 has a flat rectangular surface although other shapes may be known.

In the alternative embodiment of the pin 220 the user inserts the pin 220 into the channel 102. The spring 210, if used, is compressed between the flange 228 and the outside edge of the firearm 100. The detent pin is disposed within the shaped groove 222. When the user desires to open the action of the firearm the user engages the flange 228 and the spring pushes the pin 220 laterally outward. The pin 220 moves partially from the firearm 110. The pin 220 moves to a point where the indentation 226 is disposed in the channel 102 at the point where the outer edge of the upper receiver and the outer edge of the lower receiver are disposed. The thickness of the pin 220 at the indentation 226 is less than the diameter of the hole for the pin 220 in the upper receiver and lower receiver. When the indentation 226 is disposed at the outer wall of the upper receiver and lower receiver, the upper receiver is may pivot upward so that the bottom of the hole in the upper receiver channel 102 engages the flat surface of the pin 220. In this manner the user may only partially open the action of the firearm 100. When the user desires to use the firearm 100 again the user then closes the upper receiver against the lower receiver and pushes the pin 200 fully back into the channel 102 of the firearm 100.

Referring to FIGS. 10A-D, an alternative embodiment of the pin 220 is illustrated. This embodiment of the pin 220 is similar to the embodiment illustrated in FIGS. 9A-D.

In this embodiment the pin 220 comprises a special shaped groove 222. The shaped groove 222 is disposed on the opposite end from the flange 228. In the middle of the length of the pin 220 is an indentation 226. The indentation 226 may be any size and shape. In the preferred embodiment the indentation 226 extends over half of the diameter of the pin 220. In the preferred embodiment the indentation 226 has a flat rectangular surface although other shapes may be known. The special shaped groove 222 extends along a portion of the pin 220 in the direction of the longitudinal axis. The special shaped groove 222 has a portion extending perpendicular to the longitudinal axis of the pin 220, forming a "T" and wrapping radially around the pin 220. When the shaped groove 222 reaches the opposite side of the pin 220, the shaped groove then turns ninety degrees and extends parallel to the longitudinal axis of the pin 220. The shaped groove 222 then terminates into the second end of the pin 220.

This embodiment of the shaped groove 222 permits a user to completely remove the pin 220 from the channel 102 of the firearm 100. When fully inserted into the channel 102, the detent pin fits within the portion of the shaped groove 222 which has closed ends along the longitudinal axis. If the user desires, the user can rotate the pin 220 so that the detent pin travels along the perpendicular portion of the shaped groove 222. The detent pin then reaches the portion of the shaped groove 222 which has an open end at the second end of the pin 220, which is opposite from the first end of the pin 220 with the flange 228. The opening at the second end allows the detent pin to be fully removed from the shaped groove 222 and the pin 220 can be removed from the channel 102 of the firearm 100.

The separate components of the takedown pin assembly 200 may be made from any material but are preferably composed of metal. Other components may be utilized in other forms without departing from the scope of the invention. For instance, the spring 210 is disclosed as a compression spring but other springs may be utilized, such as a torsion spring which causes the pin to rotate about its axis. In another embodiment the spring 210 is disposed in an internal cavity of the firearm 100 and pushes the pin 220 outward from the channel 102.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A takedown pin assembly comprising
   a) an elongate pin having a first end, a second end, and a longitudinal axis extending between said first end and said second end; said elongate pin further comprising a channel within a body of said pin and wherein said channel extends along at least a portion of said elongate pin in a direction parallel to said longitudinal axis; wherein said channel has a width sufficient to receive a detent pin from a firearm; wherein said elongate pin is configured to fit within a takedown pin receiving hole in an upper receiver or lower receiver of a firearm;
   b) a spring having a first end and a second end;
   c) a head disposed on said first end of said elongate pin, wherein said head has a lever handle extending laterally from a center portion of said head; and
   d) wherein said elongate pin is disposed within a space within said spring.

2. The takedown pin assembly as in claim 1 wherein said elongate pin further comprises a flange disposed at said first end of said elongate pin.

3. The takedown pin assembly as in claim 1 wherein said elongate pin further comprises a protrusion extending from said first end of said elongate pin.

4. The takedown pin assembly as in claim 3 wherein said protrusion on said first end of said elongate pin extends in a direction parallel to said longitudinal axis.

5. The takedown pin assembly as in claim 3 wherein said protrusion on said first end of said elongate pin extends perpendicular to said longitudinal axis.

6. The takedown pin assembly as in claim 1 wherein said head further comprises
   a) a central recess in said center portion; and
   b) one or more cavities disposed in said central recess.

7. The takedown pin assembly as in claim 1 wherein said channel of said elongate pin further comprises a lateral extension disposed at an angle to said longitudinal axis.

8. The takedown pin assembly as in claim 1
   a) wherein said channel of said elongate pin further comprises a plurality of lateral extensions; and
   b) wherein each of said plurality of lateral extensions is disposed at an angle to said longitudinal axis.

9. The takedown pin assembly as in claim 1 wherein said head further comprises a central recess having a plurality of cavities disposed radially around a center point in said central recess.

10. The takedown pin assembly as in claim 1
    a) wherein said channel has a first depth at a first point and a second depth at a second point; and
    b) wherein said first depth and said second depth are not equal.

11. The takedown pin assembly as in claim 2 further comprising
    a) wherein said elongate pin further comprises
       i) a protrusion extending from said first end of said elongate pin in a direction parallel to said longitudinal axis;
    b) wherein said channel of said elongate pin further comprises a lateral extension disposed at an angle to said longitudinal axis;
    c) wherein said head further comprises
       i) a central recess in said center portion;
       ii) one or more cavities disposed in said central recess; and
    d) wherein said protrusion is configured to be disposed within said one or more cavities when said spring is compressed.

12. The takedown assembly as in claim 11 wherein said head further comprises a plurality of cavities disposed radially around a center point in said central recess.

13. A takedown pin assembly comprising
    a) an elongate pin having a first end, a second end, and a longitudinal axis extending between said first end and said second end; wherein said elongate pin further comprises
       i) a lever extending laterally from said first end of said elongate pin;
       ii) a channel within a body of said pin, wherein said channel extends along at least a portion of said elongate pin in a direction parallel to said longitudinal axis; wherein said channel has a width sufficient to receive a detent pin from a firearm;
       iii) wherein said elongate pin is configured to fit within a hole in an upper receiver or lower receiver of a firearm; and
    b) a spring having a first end and a second end, wherein said spring is in contact with an external surface of said elongate pin.

14. The takedown pin assembly as in claim 13 wherein said channel of said elongate pin further comprises a lateral extension disposed at an angle to said longitudinal axis.

15. The takedown pin assembly as in claim 13
    a) wherein said channel of said elongate pin further comprises a plurality of lateral extensions; and b) wherein each of said plurality of lateral extensions is disposed at an angle to said longitudinal axis.

16. A takedown pin assembly comprising
a) an elongate pin having a first end, a second end, and a longitudinal axis extending between said first end and said second end; said elongate pin further comprising
i) a channel within the body of said elongate pin, wherein said channel extends along at least a portion of said elongate pin in a direction parallel to said longitudinal axis and wherein said channel has a width sufficient to receive a detent pin from a firearm;
ii) an indentation extending into said elongate pin; wherein said indentation is disposed between said channel and said first end; wherein said indentation extends along at least a second portion of said elongate pin in a direction parallel to said longitudinal axis;
b) a spring having a first end and a second end;
c) wherein said elongate pin is disposed within a space in said spring; and
d) wherein said elongate pin is configured to fit within a takedown pin receiving hole in an upper receiver or lower receiver of a firearm.

17. The takedown pin assembly as in claim 16 wherein said channel of said elongate pin further comprises a lateral extension disposed at an angle to said longitudinal axis.

18. The takedown pin assembly as in claim 17 wherein said channel of said pin further comprises a second portion disposed at an end of said lateral extension; wherein said second portion extends in a direction parallel to said longitudinal axis; wherein said second portion has an end opening disposed at said second end of said elongate pin.

19. The takedown pin assembly as in claim 18 a lever extending laterally from said first end of said elongate pin.

20. The takedown pin assembly as in claim 16 a lever extending laterally from said first end of said elongate pin.

* * * * *